(12) United States Patent
Gospodinova et al.

(10) Patent No.: US 12,054,799 B2
(45) Date of Patent: Aug. 6, 2024

(54) METHOD FOR PRODUCING A HIGH STRENGTH STEEL SHEET HAVING IMPROVED DUCTILITY AND FORMABILITY, AND OBTAINED STEEL SHEET

(71) Applicant: ArcelorMittal, Luxembourg (LU)

(72) Inventors: Maya Gospodinova, Maizieres-les-Metz (FR); Véronique Hebert, Saint-Julien-les-Metz (FR); Pavan Venkatasurya, East Chicago, IN (US)

(73) Assignee: ARCELORMITTAL, Luxembourg (LU)

( * ) Notice: Subject to any disclaimer, the term of this patent is extended or adjusted under 35 U.S.C. 154(b) by 0 days.

(21) Appl. No.: 16/064,596

(22) PCT Filed: Dec. 20, 2016

(86) PCT No.: PCT/EP2016/082037
§ 371 (c)(1),
(2) Date: Jun. 21, 2018

(87) PCT Pub. No.: WO2017/108866
PCT Pub. Date: Jun. 29, 2017

(65) Prior Publication Data
US 2019/0003008 A1 Jan. 3, 2019

(30) Foreign Application Priority Data
Dec. 21, 2015 (WO) .................. PCT/IB2015/059839

(51) Int. Cl.
*C21D 9/46* (2006.01)
*B23K 11/11* (2006.01)
(Continued)

(52) U.S. Cl.
CPC ................ *C21D 9/46* (2013.01); *B23K 11/11* (2013.01); *B32B 15/013* (2013.01); *C21D 1/18* (2013.01);
(Continued)

(58) Field of Classification Search
CPC ... B32B 15/013; C21D 1/18; C21D 2211/001; C21D 2211/002; C21D 2211/005;
(Continued)

(56) References Cited

U.S. PATENT DOCUMENTS 9,121,087 B2   9/2015   Matsuda et al.
9,200,343 B2  12/2015   Matsuda et al.
(Continued)

FOREIGN PATENT DOCUMENTS

CN    101460646 A    6/2009
CN    102884218 A    1/2013
(Continued)

OTHER PUBLICATIONS

1998. "Steel Sheet, Strip, and Plate", Metals Handbook Desk Edition, 2nd Ed., Joseph R. Davis. p. 225-232. (Year: 1998).*
(Continued)

*Primary Examiner* — Nicholas A Wang
(74) *Attorney, Agent, or Firm* — Davidson Kappel LLC (57) ABSTRACT

A method for producing a steel sheet is provided. The method includes providing a cold-rolled steel sheet including in weight %: 0.15%≤C≤0.23%, 1.4%≤Mn≤2.6%, 0.6%≤Si≤1.5%, 0.02%≤Al≤1.0%, with 1.0%≤Si+Al≤2.0%, 0≤Nb≤0.035%, 0≤Mo≤0.3%, 0≤Cr≤0.3%, and a remainder of Fe and unavoidable impurities, annealing the steel sheet at an annealing temperature between Ac1 and Ac3 to obtaining at least 40% austenite and at least 40% intercritical ferrite, quenching the sheet from at least 600° C. at a cooling rate of at least 20° C./s to a quenching temperature between
(Continued)

180° C. and 260° C., heating the sheet to a partitioning temperature between 375° C. and 470° C. and maintaining the sheet at this partitioning temperature for a partitioning time Pt between 25 s and 440 s, then cooling the sheet to room temperature. A steel sheet is also provided.

33 Claims, 1 Drawing Sheet (51) Int. Cl.
    B32B 15/01      (2006.01)
    C21D 1/18       (2006.01)
    C21D 6/00       (2006.01)
    C21D 8/02       (2006.01)
    C22C 38/00      (2006.01)
    C22C 38/04      (2006.01)
    C22C 38/06      (2006.01)
    C22C 38/22      (2006.01)
    C22C 38/26      (2006.01)
    C22C 38/34      (2006.01)
    C22C 38/38      (2006.01)
    C23C 2/06       (2006.01)
    C23C 2/40       (2006.01)

(52) U.S. Cl.
    CPC ............ *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0247* (2013.01); *C21D 8/0263* (2013.01); *C22C 38/00* (2013.01); *C22C 38/04* (2013.01); *C22C 38/06* (2013.01); *C22C 38/22* (2013.01); *C22C 38/26* (2013.01); *C22C 38/34* (2013.01); *C22C 38/38* (2013.01); *C23C 2/06* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
    CPC .. C21D 2211/008; C21D 6/002; C21D 6/005; C21D 6/008; C21D 8/0205; C21D 8/0226; C21D 8/0236; C21D 8/0247; C21D 8/0263; C21D 9/46; C22C 38/00; C22C 38/04; C22C 38/06; C22C 38/22; C22C 38/26; C22C 38/34; C22C 38/38
    See application file for complete search history.

(56) References Cited

U.S. PATENT DOCUMENTS

| | | | |
|---|---|---|---|
| 9,580,786 B2 | 2/2017 | Sohn et al. | |
| 9,631,250 B2 | 4/2017 | Kawabe et al. | |
| 10,470,752 B2 | 12/2019 | Butters et al. | |
| 2004/0074575 A1* | 4/2004 | Kashima | C21D 8/0226 148/653 |
| 2005/0230008 A1* | 10/2005 | Katou | C22C 38/04 148/320 |
| 2006/0011274 A1 | 1/2006 | Speer et al. | |
| 2006/0108035 A1 | 5/2006 | Sun | |
| 2006/0130937 A1 | 6/2006 | Ikeda et al. | |
| 2009/0053096 A1 | 2/2009 | Miura et al. | |
| 2009/0053556 A1 | 2/2009 | Sohn et al. | |
| 2009/0214377 A1 | 8/2009 | Hennig et al. | |
| 2010/0218857 A1* | 9/2010 | Nakagaito | C21D 8/0436 148/533 |
| 2010/0221138 A1 | 9/2010 | Nakaya et al. | |
| 2011/0146852 A1* | 6/2011 | Matsuda | C21D 6/00 148/533 |
| 2011/0198002 A1 | 8/2011 | Nakagaito et al. | |
| 2013/0133786 A1 | 5/2013 | Matsuda et al. | |
| 2013/0133792 A1* | 5/2013 | Nakagaito | C21D 9/46 148/645 |
| 2013/0167980 A1* | 7/2013 | Kawata | C21D 9/46 148/333 |
| 2014/0000765 A1 | 1/2014 | Nozaki et al. | |
| 2014/0050941 A1* | 2/2014 | Kawasaki | B32B 15/012 428/653 |
| 2014/0162088 A1* | 6/2014 | Kawata | C22C 38/22 428/659 |
| 2014/0234658 A1 | 8/2014 | Nozaki et al. | |
| 2014/0242416 A1 | 8/2014 | Matsuda et al. | |
| 2014/0299237 A1 | 10/2014 | Somani et al. | |
| 2014/0311631 A1 | 10/2014 | Hayashi et al. | |
| 2014/0342183 A1* | 11/2014 | Wakabayashi | C21D 8/0426 428/659 |
| 2014/0377582 A1 | 12/2014 | Azuma et al. | |
| 2015/0086808 A1 | 3/2015 | Kasuya et al. | |
| 2015/0203947 A1 | 7/2015 | Hasegawa et al. | |
| 2015/0337408 A1 | 11/2015 | Schluz et al. | |
| 2016/0010168 A1 | 1/2016 | Angles | |
| 2017/0051378 A1* | 2/2017 | Lee | C21D 8/0226 |
| 2017/0191150 A1* | 7/2017 | Hanlon | C22C 18/00 |
| 2017/0369979 A1 | 12/2017 | Wakabayashi et al. | |

FOREIGN PATENT DOCUMENTS

| | | |
|---|---|---|
| CN | 103069040 A | 4/2013 |
| CN | 104278194 A | 1/2015 |
| DE | 102012013113 A1 | 12/2013 |
| EP | 1365037 A1 | 11/2003 |
| EP | 1674586 A1 | 6/2006 |
| EP | 1676932 A1 | 7/2006 |
| EP | 2325346 A1 | 5/2011 |
| EP | 2436794 A1 | 4/2012 |
| EP | 2546368 A1 | 1/2013 |
| EP | 2578718 A1 | 4/2013 |
| EP | 2617849 A1 | 7/2013 |
| EP | 2738276 A1 | 6/2014 |
| EP | 2824210 A1 | 1/2015 |
| EP | 2824210 A1 | 1/2015 |
| EP | 3034644 A1 | 6/2016 |
| EP | 3346018 A1 | 7/2018 |
| JP | 2003073773 A | 3/2003 |
| JP | 2003171735 A | 6/2003 |
| JP | 2003277884 A | 10/2003 |
| JP | 2004218025 A | 8/2004 |
| JP | 2006176807 A | 7/2006 |
| JP | 2006207016 A | 8/2006 |
| JP | 2009209450 A | 9/2009 |
| JP | 2010116593 A | 5/2010 |
| JP | 2010181381 A | 8/2010 |
| JP | 201241573 * | 3/2012 |
| JP | 2012041573 A | 3/2012 |
| JP | 2012041573 A | 3/2012 |
| JP | 2012237042 A | 12/2012 |
| JP | 2012237042 A | 12/2012 |
| JP | 2013237877 A | 11/2013 |
| JP | WO2012036269 A1 | 2/2014 |
| JP | 2015113504 A | 6/2015 |
| KR | 1020150121155 | 10/2015 |
| RU | 2485202 C1 | 6/2013 |
| RU | 2531216 C2 | 10/2014 |
| WO | 2004022794 A1 | 3/2004 |
| WO | 2007142197 A1 | 12/2007 |
| WO | WO2007142197 A1 | 12/2007 |
| WO | WO2013047836 A1 | 4/2013 |
| WO | WO2013118679 A1 | 8/2013 |
| WO | WO2014131907 A1 | 9/2014 |
| WO | WO2015015239 A1 | 2/2015 |

OTHER PUBLICATIONS

John G Speer et al, "Analysis of Microstructure Evolution in Quenching and Partitioning Automotive Sheet Steel," Metallurgical and Materials Transactions A, Sep. 15, 2011, pp. 3591-3601, vol. 42, No. 12, Spring-Verlag, New York.

(56) References Cited

OTHER PUBLICATIONS

Guhui Gao et al, "Enhanced ductility and toughness in an ultrahigh-strength Mn—Si—Cr—C steel: The great potential of ultrafine filmy retained austenite," Acta Materialia, Jun. 26, 2014, pp. 425-433, vol. 76, XP055175674.
Kai Zhang et al, "Microstructure and Mechanical Properties of a Nb-Microalloyed Medium Carbon Steel Treated by Quenching-Partitioning Process," Key Engineering Materials, Dec. 1, 2012, pp. 596-599, vol. 531-532, XP055175312.
Guhui Gao et al, "A carbide-free bainite/martensite/austenite triplex steel with enhanced mechanical properties treated by a novel quenching-partitioning-tempering process," Materials Science and Engineering A, Jan. 1, 2013, pp. 165-169, vol. 559, XP055176061.
Lader et.al., "Acicular Ferrite Formation and its Influencing Factors," Journal of Material Ccience Research, vol. 6, No. 1, 2017.
K.W Andrews: "Empirical Formulae for the Calculation of some Transformation Temperatures".
Koji Kishida: "High Strength Steel Sheets for Light Weight Vehicle".
Samuels, L E. "Light Microscopy of Carbon Steels," ASM International, 2003, pp. 6 to 8.

* cited by examiner

METHOD FOR PRODUCING A HIGH STRENGTH STEEL SHEET HAVING IMPROVED DUCTILITY AND FORMABILITY, AND OBTAINED STEEL SHEET

The present invention provides a method for producing a high strength steel sheet having improved ductility and formability and a sheet obtained with this method.

BACKGROUND

To manufacture various equipments such as parts of body structural members and body panels for automotive vehicles, it is known to use sheets made of DP (Dual Phase) steels or TRIP (Transformation Induced Plasticity) steels.

It is also known to use steels having a bainitic structure, free from carbides precipitates, with retained austenite, containing about 0.2% of C, about 2% of Mn, about 1.7% of Si, with a yield strength of about 750 MPa, a tensile strength of about 980 MPa, a total elongation of about 8%. These sheets are produced on continuous annealing lines by cooling from an annealing temperature higher than the $Ac_3$ transformation point, down to a holding temperature above the Ms transformation point and maintaining the sheet at the temperature for a given time.

For example, JP 2012041573 discloses a method for manufacturing a TRIP steel sheet, comprising 10% to 93% of the sum of ferrite and bainite, 5% to 30% of retained austenite, 5% to 20% of martensite and up to 5% of pearlite. This method comprises the steps of annealing a hot-rolled or cold-rolled steel sheet, cooling the steel sheet to a cooling stop temperature and holding the sheet at this temperature for 1 s to 1000 s. During the holding at the cooling stop temperature, the austenite first partly transforms into bainite. Then, the carbon partitions from the bainite to the austenite. However, according to the examples of JP 2012041573, no martensite is formed after the cooling to the cooling stop temperature and before the holding at this temperature. As a result, the martensite present in the structure, resulting from the final cooling, is not partitioned, and retains a relatively high C content, leading to a high yield strength and an unsatisfactory formability.

BRIEF SUMMARY OF THE INVENTION

To reduce the weight of the automotive in order to improve their fuel efficiency in view of the global environmental conservation, it is desirable to have sheets having improved yield and tensile strengths. But such sheets must also have a good ductility and a good formability and more specifically a good stretch flangeability.

In this respect, it is desirable to have coated or non-coated sheets having a tensile strength TS of at least 980 MPa, a total elongation TE of at least 16%, preferably of at least 17%, still preferably at least 18%, and a hole expansion ratio HER of more than 20%. The tensile strength TS and the total elongation TE are measured according to ISO standard ISO 6892-1, published in October 2009. It must be emphasized that, due to differences in the methods of measurement, in particular due to differences in the geometries of the specimen used, the values of the total elongation TE according to the ISO standard are very different, and are in particular lower, than the values of the total elongation measured according to the JIS Z 2201-05 standard. The hole expansion ratio HER is measured according to ISO standard 16630:2009. Due to differences in the methods of measure, the values of the hole expansion ratio HER according to the ISO standard 16630:2009 are very different and not comparable to the values of the hole expansion ratio A according to the JFS T 1001 (Japan Iron and Steel Federation standard).

It is also desirable to have coated or non coated steel sheets having mechanical properties or features as mentioned above, in a thickness range from 0.7 to 3 mm, and more preferably in the range of 0.8 to 2 mm.

Therefore, an object of the present invention is to provide a sheet with the mechanical features and properties mentioned above and a method to produce it.

The present invention provides a method for producing a steel sheet having a tensile strength of at least 980 MPa, a total elongation according to ISO standard 6892-1 of at least 16% and a hole expansion ratio according to ISO standard 16630:2009 HER of at least 20%, wherein the method comprises the following successive steps:

providing a cold-rolled steel sheet, a chemical composition of the steel containing in weight %:
0.15%≤C≤0.23%
1.4%≤Mn≤2.6%,
0.6%≤Si≤1.5%
0.02%≤Al≤1.0%,
with 1.0%≤Si+Al≤2.0%,
0≤Nb≤0.035%,
0≤Mo≤0.3%,
0≤Cr≤0.3%,
the remainder being Fe and unavoidable impurities, annealing the steel sheet at an annealing temperature TA comprised between Ac1 and Ac3 so as to obtain a structure comprising at least 40% of austenite and at least 40% of intercritical ferrite, quenching the sheet from a temperature of at least 600° C. at a cooling rate of at least 20° C./s down to a quenching temperature QT comprised between 180° C. and 260° C., heating the sheet up to a partitioning temperature PT between 375° C. and 470° C. and maintaining the sheet at this partitioning temperature PT for a partitioning time Pt comprised between 25 s and 440 s, the partitioning time Pt being comprised between 100 s and 440 s if the partitioning temperature PT is comprised between 375° C. and 400° C., and comprised between 25 s and 150 s if the partitioning temperature PT is comprised between 450° C. and 470° C., and cooling the sheet down to the room temperature, the steel sheet having a final microstructure consisting, in area fraction, of:

at least 11% of tempered martensite, the tempered martensite having a C content of at most 0.45%,
between 10% and 20% of retained austenite,
between 40% and 60% of ferrite,
at most 5% of fresh martensite,
at most 18% of bainite.

The bainite includes lower bainite.

Preferably, the tempered martensite has a C content of at most 0.03%.

Preferably, the quenched sheet has, just before the heating to the partitioning temperature PT, a structure consisting of, in area fraction, between 40% and 60% of ferrite, at least 15% of retained austenite, at least 11% of martensite and at most 18% of lower bainite.

In a preferred embodiment, the method comprises, between the annealing step and the quenching step, a step of slow cooling the sheet to a temperature higher than or equal to 600° C. at a cooling rate lower than 10° C./s.

In this embodiment, the ferrite comprises, in area fraction with respect to the whole structure, between 40% and 60% of intercritical ferrite, and between 0% and 15% of transformation ferrite, said transformation ferrite being formed during the slow cooling step, it being understood that the ferrite fraction, which is the sum of the intercritical ferrite and the transformation ferrite fractions, is comprised between 40% and 60%.

According to a preferred embodiment, the step of providing said cold-rolled steel sheet comprises:
- hot rolling a sheet made of said steel to obtain a hot rolled steel sheet,
- coiling said hot-rolled steel sheet at a temperature Tc comprises between 400° C. and 750° C.,
- performing a batch annealing at a temperature THBA comprised between 500° C. and 700° C. for a time comprised between 2 and 6 days, and
- cold rolling said hot-rolled steel sheet to obtain said cold-rolled steel sheet.

Preferably, after the sheet is quenched to the quenching temperature QT and before the sheet is heated to the partitioning temperature PT, the sheet is held at the quenching temperature QT for a holding time comprised between 2 s and 8 s, preferably between 3 s and 7 s.

Preferably, the chemical composition of the steel satisfies at least one of the following conditions: C≥0.17%, C≤0.21%, Mn≥1.9%, Mn≤2.5%, 0.010%≤Nb, Mo≤0.05% or Mo≥0.1%, Cr≤0.05%, or Cr≥0.1%.

According to a preferred embodiment, between the maintaining of the sheet at the partitioning temperature PT and the cooling of the sheet to the room temperature, the steel sheet is hot-dip coated at a temperature not more than 480° C., the partitioning temperature PT is comprised between 400° C. and 470° C. and the partitioning time Pt is comprised between 25 s and 150 s.

According to another preferred embodiment, after the maintaining of the sheet at the partitioning temperature PT, the sheet is immediately cooled to the room temperature, the partitioning temperature PT is comprised between 375° C. and 450° C. and the partitioning time Pt is comprised between 100 s and 440 s.

In this embodiment, after the step of cooling down the steel sheet to the room temperature, the steel sheet is for example coated by an electrochemical method or through a vacuum coating process.

For example, the steel sheet is coated with Zn or a Zn alloy.

According to a preferred embodiment, the chemical composition of the steel is such that C+Si/10≤0.30% and Al≥6 (C+Mn/10)−2.5%.

In this embodiment, the chemical composition of the steel is preferably such that 0.6%≤Si≤1.3% and 0.5%<Al≤1.0%, still preferably such that 0.7%≤Si<1.0% and 0.7%≤Al≤1.0%.

According to another preferred embodiment, the chemical composition of the steel is such that 1.0%≤Si≤1.5% and 0.02%≤Al≤0.5%.

The invention also provides a process for producing a resistance spot weld of at least two steel sheets, said process comprising:
- producing a first steel sheet by a method according to the invention, coated with Zn or a Zn alloy, and such that C+Si/10≤0.30% and Al≥6 (C+Mn/10)−2.5%,
- providing a second steel sheet having a composition such that C+Si/10≤0.30% and Al≥6 (C+Mn/10)−2.5%, and
- resistance spot welding said first steel sheet to said second steel sheet.

Preferably, the second steel sheet is according to the invention, and is coated with Zn or a Zn alloy.

The invention also provides a steel sheet, wherein the chemical composition of the steel contains in weight %:
- 0.15%≤C≤0.23%
- 1.4%≤Mn≤2.6%,
- 0.6%≤Si≤1.5%
- 0.02%≤Al≤1.0%,
- with 1.0%≤Si+Al≤2.0%,
- 0≤Nb≤0.035%,
- 0≤Mo≤0.3%,
- 0≤Cr≤0.3%, the remainder being Fe and unavoidable impurities, said steel sheet having a microstructure consisting of, in area fraction:
- at least 11% of tempered martensite, the tempered martensite having a C content of at most 0.45%,
- between 10% and 20% of retained austenite,
- between 40% and 60% of ferrite,
- at most 6% of fresh martensite,
- at most 18% of bainite.

The bainite includes lower bainite.

Preferably, the tempered martensite has a C content of at most 0.03%.

In a preferred embodiment, the ferrite comprises, with respect to the whole structure, between 40% and 60% of intercritical ferrite and between 0% and 15% of transformation ferrite.

Preferably, the C content in the retained austenite is comprised between 0.9% and 1.2%.

Preferably, the steel sheet has a yield strength of at least 550 MPa, a tensile strength of at least 980 MPa, a total elongation according to ISO 6892-1 of at least 16% and a hole expansion ratio according to ISO 16630:2009 HER of at least 20%.

Still preferably, the yield strength is comprised between 550 and 860 MPa. Especially, a yield strength below 860 MPa allows guaranteeing an excellent formability.

The chemical composition of the steel preferably satisfies at least one of the following conditions: C≥0.17%, C≤0.21%, Mn≥1.9%, Mn≤2.5%, Mo≤0.05% or Mo≥0.1%, 0.010%≤Nb, Cr≤0.05% or Cr≥0.1%.

According to a preferred embodiment, the chemical composition of the steel is such that C+Si/10≤0.30% and Al≥6 (C+Mn/10)−2.5%.

In this embodiment, the chemical composition of the steel is preferably such that 0.6%≤Si≤1.3% and 0.5%<Al≤1.0%, still preferably such that 0.7%≤Si<1.0% and 0.7%≤Al≤1.0%.

According to another preferred embodiment, the chemical composition of the steel is such that 1.0%≤Si≤1.5% and 0.02%≤Al≤0.5%.

The steel sheet is for example coated with Zn or a Zn alloy, the coating resulting from a coating at a temperature less than 480° C.

Preferably, the thickness of said steel sheet is comprised between 0.7 and 3 mm, preferably between 0.8 and 2 mm.

The invention also provides a welded structure comprising at least ten resistance spot welds of at least two steel sheets, wherein a first steel sheet is according to the invention, coated with Zn or a Zn alloy and such that C+Si/10≤0.30% and Al≥6 (C+Mn/10)−2.5%, and a second steel sheet has a composition such that C+Si/10≤0.30% and Al≥6 (C+Mn/10)−2.5%, the mean number of cracks per resistance spot weld being less than 6.

Preferably, the second steel sheet is according to the invention, and is coated with Zn or a Zn alloy.

The invention further provides the use of a steel sheet produced according to the method of the invention, or of a steel sheet according to the invention, for the manufacture of structural parts in motor vehicles.

The invention further provides the use of a resistance spot weld manufactured according to the process of the invention, or of a welded structure according to the invention, for the manufacture of structural parts in motor vehicles.

BRIEF DESCRIPTION OF THE DRAWINGS

A preferred embodiment of the present invention will be elucidated with reference to the FIGURE which shows a micrograph of the microstructure according to the invention.

DETAILED DESCRIPTION

Figure 1:
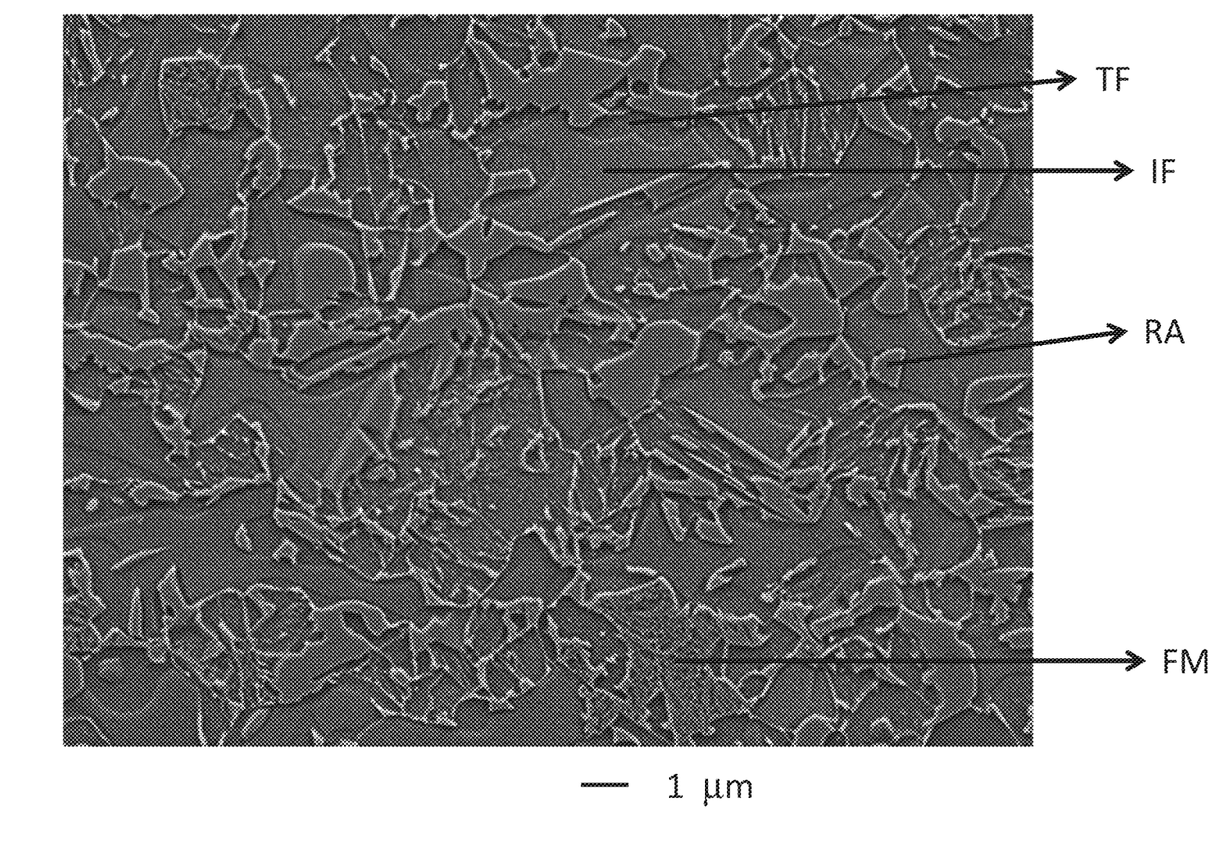

The invention will now be described in detail with reference to FIGURE, but without introducing limitations.

The composition of the steel according to the invention comprises, in weight percent:

0.15% to 0.23% of carbon for ensuring a satisfactory strength and improving the stability of the retained austenite which is necessary to obtain a sufficient elongation. Preferably, the carbon content is higher than or equal to 0.17%, and/or lower than or equal to 0.21%. If the carbon content is too high, the hot rolled sheet is too hard to cold roll and the weldability is insufficient. If the carbon content is below 0.15%, the tensile strength will not reach 980 MPa;

1.4% to 2.6% of manganese. The minimum is defined to have a sufficient hardenability in order to obtain a microstructure containing at least 11% of tempered martensite, and a tensile strength of more than 980 MPa. The maximum is defined to avoid having segregation issues which are detrimental for the ductility. Preferably, the manganese content is higher than or equal to 1.9%, and/or lower than or equal to 2.5%;

0.6% to 1.5% of silicon and 0.02% to 1.0% of aluminum, the sum of the silicon and aluminum contents being comprised between 1.0% and 2.0%.

A certain amount of aluminum is combined with oxygen as $Al_2O_3$, and with nitrogen as AlN; this amount depends on O and N contents and remains less than 0.025%. The remainder if it exists is not combined and consists in "free aluminum".

The aluminum which is combined with oxygen results from the deoxidation in the liquid stage. It is detrimental for to the ductility properties and therefore, its content has to be limited as much as possible.

The aluminum which is combined with nitrogen slows down the austenitic grains growth during annealing. Nitrogen is a residual element resulting from the smelting and is less than 0.010% in the steel sheet.

After heating in the austenitic range, the inventors have found that Si and free Al stabilize the austenite by delaying the formation of carbides. This occurs in particular if the steel sheet is cooled at a temperature so as to obtain a partial martensitic transformation, and immediately reheated and maintained at a partitioning temperature PT during which the carbon is redistributed from martensite to austenite. If Si and free Al content additions are in sufficient amount, the carbon redistribution occurs without significant carbides precipitation. For this purpose Si+Al has to be more than 1.0% in weight (but less than 2.0%). Moreover, Si provides a solid solution strengthening and improves the hole expansion ratio. But the Si content has to be limited to 1.5% to avoid the formation of silicon oxides at the surface of the sheet which would be detrimental to the coatability.

Moreover, the inventors have found that when Si/10>0.30%−C (Si and C being expressed in weight percentage), due to the LME (liquid metal embrittlement phenomenon), silicon is detrimental to the spot welding of coated sheets and particularly to galvanized or galvannealed or electrogalvanized sheets. LME occurrence causes cracks at grain boundaries in the heat affected zones and in the weld metal of welded joints. Therefore (C+Si/10) has to be maintained less than or equal to 0.30%, especially if the sheet is to be coated.

They have also found that to reduce the LME occurrence, for the domain of composition which is considered, the Al content has to be higher than or equal to 6(C+Mn/10)−2.5%.

Thus, according to a first embodiment, particularly when LME is not likely to appear, Al is added only to deoxidize or optionally to control the austenitic grains growth during annealing, its content being less than or equal to 0.5%, for example less than 0.1%, but at least 0.020%. According to this first embodiment, the Si content is between 1.0% and 1.5%. In this embodiment, C+Si/10 can be for example higher than 0.30%.

According to a second embodiment, particularly when the problem of LME has to be considered, in particular when the sheet is coated with Zn or Zn alloys, C+Si/10 has to be less than or equal to 0.30%. It means that Si must remain less than 1.0% at least when C is higher than 0.2%. Thus, Al is added in more important quantities in order to replace at least partly Si to stabilize austenite and to reduce the LME sensitivity when C and/or Mn contents are too high. In this second embodiment, the Al content is such that Al≥6(C+Mn/10)−2.5% and Si+Al 1.0%; therefore, Al is preferably comprised between 0.5% and 1.0% and Si is comprised between 0.6% and 1.3% preferably 0.7% and 1%. Preferably, the Al content is higher than or equal to 0.7%. However, the Al content is limited to 1.0% in order to prevent the increase of the Ac3 transformation temperature, which would imply higher cost when heating at high temperature for obtaining austenitization of the steel sheet in the annealing step.

Optionally from 0.010% to 0.035% of niobium, in order to refine the austenite grains during hot-rolling and to provide precipitation strengthening during the final heat-treatment. A Nb content of 0.010% to 0.035% makes it possible to obtain satisfactory yield strength and elongation levels, in particular a yield strength of at least 550 MPa, and even always of at least 600 MPa when the sheets are not hot-dip coated.

0% to 0.3% of molybdenum and/or 0% to 0.3% of chromium. Mo and Cr may be added to increase the hardenability and to stabilize the retained austenite in order to strongly reduce austenite decomposition during partitioning. According to an embodiment, the molybdenum and the chromium can be kept only at a low level, and their contents can be less than 0.05% each, a content of less than 0.05% corresponding to the presence of Cr or Mo as residual elements. When Mo and/or Cr are voluntarily added, their content is of at least 0.1%.

The balance is iron and residual elements resulting from the steelmaking. In this respect, Ni, Cu, Ti, V, B, S, P and N at least are considered as residual elements which are unavoidable impurities. Therefore, their contents are less than 0.05% for Ni, 0.03% for Cu, 0.007% for V, 0.0010% for B, 0.005% for S, 0.02% for P and 0.010% for N. The Ti content is limited to 0.05% because above such values, large-sized carbonitrides would precipitate mainly in the liquid stage, and the formability of the steel sheet would decrease, making the 17% target for the total elongation more difficult to reach.

When the sheets are coated with Zn or Zn alloys, the spot weldability can be affected by the LME phenomenon (Liquid Metal Embrittlement).

The sensitivity of a particular steel to this phenomenon can be evaluated by tensile test performed at high temperature. In particular, this hot tensile test can be performed using a Gleeble RPI thermal simulator, such device being known per se in the art.

This test which is named "Gleeble LME test" is described as follows:
- samples of coated sheet having a thickness from 0.7 mm to 3 mm are submitted to high temperature tensile tests in order to determine which is the minimal critical displacement for which cracking around the welded zone occur. The samples which are cut in the sheet have a calibrated zone which is 10 mm long and 10 mm wide, and heads which are 40 mm long and 30 mm wide, the radius of curvature between the heads and the calibrated part being 5 mm.
- the high temperature tensile tests are performed by heating rapidly (1000° C./s) each sample, maintaining the sample at a predetermined temperature and submitting the heated sample to a predetermined elongation or displacement, then cooling down the sample in air, the elongation or displacement being maintained. After cooling, the samples are observed in order to determine if there is LME cracking or not. It is determined that the sample has a crack if at least one crack of at least 2 mm is formed on the sample.
- the tests are made at a plurality of predetermined temperatures, such as 700° C., 750° C., 800° C., 850° C., 900° C. and 950° C., and with elongations or displacements of 0.5 mm, 0.75 mm, 1 mm, 1.25 mm, 1.5 mm, 1.75 mm, 2 mm, and so on; the elongations or displacements are the elongations or displacements of the jaws maintaining the samples on the Gleeble simulator,
- the critical displacement for cracking onset is reported and the minimum critical displacement, i.e. the minimum displacement for which cracking occurs, is determined for the considered temperature range.

Usually, it is considered that when the minimum critical displacement is less than 1.5 mm at a temperature between 700° C. and 800° C., the probability of occurrence of LME in resistance spot welding is high, and when the minimum critical displacement is at least 1.5 mm, the probability to observe many LME cracks in resistance spot welding is low.

In this respect, the inventors have discovered that for steels corresponding to the present invention or similar to these steels, if the composition is such that (C+Si/10) is less than or equal to 0.30%, and Al is higher than or equal to 6(C+Mn/10)−2.5%, the minimum critical displacement is at least 1.5 mm, and when (C+Si/10) is more than 0.30% and/or Al is lower than 6(C+Mn/10)−2.5%, the minimum critical displacement is less than 1.5 mm, and even less than 1 mm.

As examples, Gleeble LME tests have been made with steels having the following compositions:
S1: C=0.226%, Mn=2.01%, Si=0.716. Al=0.802%, Cr=0.097%
S2: C=0.204%, Mn=2.07%, Si=1.44%, Al=0.033%, Cr=0.341%

For S1, C+Si/10=0.2976% and the minimum critical displacement is 2.25 mm.

For S2, C+Si/10=0.4412% and the minimum critical displacement is 0.9 mm.

Another method for evaluating the spot weldability of the coated sheets is a "LME spot welding test" which allows determining the probability to have cracked welds among an important number of resistance spot welds, for example in an industrial production of products comprising parts which are assembled by resistance spot welding such as, for example, car bodies.

This "LME spot welding test" is derived from the electrode life test for resistance spot welding in which a plurality of resistance spot welds, for example 30, are performed on three sheets superposed together: the sheet to be tested and two support sheets made of galvanized low carbon sheets, for example DX54D+Z according to EN 10346. The thicknesses of the sheets are 1.6 mm and the resistance spot welds are made according to the ISO Standard 18278-2 for heterogeneous assemblies. The parameters are:
- electrode tip diameter: 8 mm,
- welding force: 4.5 kN,
- welding time: 3 pulses of 180 ms separated by 40 ms periods (cool times),
- holding time: 400 ms.

For this test, in order to determine the eventual occurrence of cracks in the resistance spot welds, the samples are cut and polished. The resistance spot welds are then etched with picric acid, and observed by microscope, for example with a 200× magnification, in order to determine the number of cracks in each observed resistance spot weld and the sum of the length of the cracks in each resistance spot weld.

For the examples S1 and S2, the proportions of the numbers of cracks for each resistance spot weld are as follows:
S1: Gleeble LME test≥1.5 mm, 80% of the resistance spot welds have less than 10 cracks, 0% have 20 or more cracks,
S2: Gleeble LME test<1.5 mm, only 40% of the resistance spot welds have less than 10 cracks, and 30% have 20 or more cracks.

If the mean number of cracks in each resistance spot weld is considered, the results are as follows:
S1: the mean number of cracks in each resistance spot weld is 5,
S2: the mean number of cracks in each resistance spot weld is 10.

Hot rolled sheet having a thickness between 2 and 5 mm can be produced in a known manner from the steel composition of the invention mentioned above. As an example, the reheating temperature before rolling can be comprised between 1200° C. and 1280° C., preferably about 1250° C., the finish rolling temperature is preferably comprised between Ar3 and 950° C., and preferably higher than 850° C., and the coiling is performed at a temperature preferably comprised between 400° C. and 750° C. Preferably, if Si>1.0%, the coiling temperature is lower than or equal to 550° C.

After the coiling, the sheet has a ferrito-pearlitic or ferrito-pearlito-bainitic structure.

After the coiling, the sheet is optionally batch annealed in order to reduce the hardness of the steel sheet and therefore improve the cold-rollability of the hot-rolled and coiled steel sheet.

For example, the hot-rolled and coiled steel sheet is batch annealed at a temperature between 500° C. and 700° C., for example between 550° C. and 650° C., for a time between 2 and 6 days, preferably between 3 and 5 days. This time includes the heating to the batch annealing temperature and the cooling from the batch annealing temperature to ambient temperature.

This batch annealing is preferably performed in the first embodiment of the steel composition, in particular if the steel comprises more than 1.0% Si. In the second embodiment of the composition, the batch annealing step may be omitted.

The sheet can be pickled and cold rolled to obtain a cold rolled sheet having a thickness between 0.7 mm and 3 mm, for example in the range of 0.8 to 2 mm.

Then, the sheet is heat treated on a continuous annealing line, or, if the sheet is hot-dip coated, it is preferably treated on a combined continuous annealing and hot-dip coating line.

The heat treatment and optional coating comprise the steps of:

annealing the sheet at an annealing temperature $T_A$ comprised between Ac1 and Ac3, and such that, at the end of the annealing step, the steel has a structure consisting of austenite and intercritical ferrite, the fraction of austenite being at least 40% and the fraction of intercritical ferrite being at least 40%. Ac1 and Ac3 designate respectively the temperature of start and the end of the transformation into austenite during the heating step. One skilled in the art knows how to determine the annealing temperature $T_A$ from dilatometry tests or by using semi-empirical formulae.

The sheet is maintained at the annealing temperature i.e. maintained between $T_A-5°$ C. and $T_A+5°$ C., for an annealing time $t_A$ preferably of more than 30 s, still preferably more than 80 s, but which does not need to be of more than 300 s.

optionally slow cooling the sheet from the annealing temperature $T_A$ to a cooling stop temperature, at a cooling rate lower than 10° C./s, preferably lower than 5° C./s, so as to form transformation ferrite without forming pearlite or bainite, in order to obtain a ferrite fraction (intercritical ferrite+transformation ferrite) comprised between 40% and 60%. This slow cooling steps aims at forming ferrite, in particular if the fraction of intercritical ferrite is lower than 40%. In that case, the fraction of ferrite formed during the slow cooling is higher than or equal to 40%-IF, IF being the fraction of intercritical ferrite, and lower than or equal to 60%-IF. If the fraction of intercritical ferrite is at least 40%, the slow cooling is optional. In any case, the fraction of ferrite formed during the slow cooling is lower than or equal to 60%-IF, so that the ferrite fraction remains of at most 60%. More generally, the fraction of ferrite formed during the slow cooling, if performed, is comprised between 0% and 15%, preferably at least 2% and/or at most 5%. The cooling stop temperature is higher than the Ms temperature of the austenite of the structure and preferably comprised between 750° C. and 600° C. One which is skilled in the art knows how to determine said Ms temperature. Indeed, a cooling stop temperature higher than 750° C. does not allow the formation of enough ferrite, whereas a cooling stop temperature lower than 600° C. may lead to the formation of bainite. The ferrite which may be formed during the slow cooling step, named in what follows "transformation ferrite", is different from the intercritical ferrite which remains in the structure at the end of the annealing step. In particular, contrarily to the transformation ferrite, the intercritical ferrite is polygonal.

Besides, the transformation ferrite is enriched in carbon and manganese, i.e. has carbon and manganese contents which are higher than the carbon and manganese contents of the intercritical ferrite. The intercritical ferrite and the transformation ferrite can therefore be differentiated by observing a micrograph with a FEG-TEM microscope using secondary electrons, after etching with metabisulfite. On the micrograph, as shown in the FIGURE, the intercritical ferrite appears in medium grey, whereas the transformation ferrite appears in dark grey, owing to its higher carbon and manganese contents. In the FIGURE, IF designates the intercritical ferrite, TF designates the transformation ferrite, FM designates the fresh martensite and RA designates the retained austenite. For each particular composition of the steel, one skilled in the art knows how to determine precisely the slow cooling conditions suitable to obtain the desired transformation ferrite fraction. The formation of transformation ferrite allows controlling more accurately the area fraction of ferrite in the final structure, and thus provides robustness.

just after the annealing step or the slow cooling step, quenching the sheet by cooling down from a temperature of at least 600° C. to a quenching temperature QT lower than the Ms transformation point of the austenite remaining after annealing and slow cooling, at a cooling rate fast enough to avoid the formation of ferrite and upper and granular bainite. The cooling rate is preferably higher than 20° C./s, still preferably higher than 50° C./s. For each particular composition of the steel and each structure, one skilled in the art knows how to determine the Ms transformation point of the austenite remaining after annealing and slow cooling. He also knows how to determine the quenching temperature adapted to obtain a desired structure, just after quenching, consisting of between 40% and 60% of the sum of intercritical ferrite and transformation ferrite, at least 15% of austenite, preferably between 15% and 35%, at least 11% of martensite, preferably between 11% and 40% of martensite, and at most 18% of lower bainite. Generally, the quenching temperature lies between 180° C. and 260° C. If the quenching temperature QT is lower than 180° C., the fraction of tempered (or partitioned) martensite in the final structure is too high to stabilize a sufficient amount of retained austenite above 10%, so that the total elongation does not reach 16%. Moreover, if the quenching temperature QT is higher than 260° C., the fraction of tempered martensite is too low to obtain the desired tensile strength. Preferably, the quenching temperature QT is comprised between 200° C. and 250° C.

optionally holding the quenched sheet at the quenching temperature QT for a holding time comprised between 2 s and 8 s, preferably between 3 s and 7 s.

reheating the sheet from the quenching temperature up to a partitioning temperature PT between 375° C. and 470° C., and maintaining the sheet at the partitioning temperature PT for a partitioning time Pt comprised between 25 s and 440 s. During this partitioning step, the carbon is partitioned, i.e. diffuses from the martensite into the austenite, which is thus enriched in carbon. The partitioning time Pt depends on the partitioning temperature PT. Especially, the partitioning time Pt is comprised between 100 s and 440 s if the partitioning temperature PT is comprised between 375° C. and 400° C., comprised between 25 s and 440 s if the partitioning temperature PT is comprised between 400° C. and 450°

C., and comprised between 25 s and 150 s if the partitioning temperature PT is comprised between 450° C. and 470° C. The reheating rate can be high when the reheating is performed by induction heating, for example between 6 and 13° C./s.

In a first embodiment, the sheet is immediately cooled to the room temperature after the partitioning step, without being hot dip coated. In this first embodiment, the partitioning temperature PT is comprised between 375° C. and 450° C., and preferably between 400° C. and 450° C., and the partitioning time Pt is comprised between 100 s and 440 s, preferably between 170 s and 430 s. A partitioning temperature PT comprised between 375° C. and 450° C. and a partitioning time Pt comprised between 100 s and 440 s make it possible to obtain a total elongation according to ISO 6892-1 of at least 17% when the sheet is not hot-dip coated.

In a second embodiment, the sheet is hot-dip coated just after the step of maintaining the sheet at the partitioning temperature PT, and then cooled to the room temperature. The hot-dip coating step is taken into account when selecting the partitioning temperature PT and the partitioning time Pt. In this second embodiment, the partitioning temperature PT is comprised between 400° C. and 470° C., and preferably between 410° C. and 465° C., and the partitioning time Pt is comprised between 25 s and 150 s, preferably between 40 s and 90 s. When the sheet is hot-dip coated, if the partitioning temperature PT is higher than 470° C. or lower than 400° C., the elongation of the final coated product is not satisfactory.

The hot dip coating can be, for example, galvanizing but all metallic hot dip coating is possible provided that the temperatures at which the sheet is brought to during coating remain less than 480° C. When the sheet is galvanized, it is performed with the usual conditions, for example through a Zn-bath with temperature ranging from 430 to 480° C. The steel according to the invention can be galvanized with Zn or with a Zn alloy, as for example zinc-magnesium or zinc-magnesium-aluminum.

- immediately after the maintaining step, or after the hot-dip coating step, cooling the sheet to the room temperature, at a cooling speed preferably higher than 1° C./s, for example between 2° C./s and 20° C./s.
- optionally, after cooling down to the room temperature, and if the sheet is not hot-dip coated, the sheet can be coated by electrochemical methods, for example electro-galvanizing, or through any vacuum coating process, like Plasma Vapor Deposition or Jet Vapor Deposition. Any kind of coatings can be used and in particular, zinc or zinc alloys, like zinc-nickel, zinc-magnesium or zinc-magnesium-aluminum alloys.

This heat treatment makes it possible to achieve a final structure (i.e. after partitioning, optional hot-dip coating and cooling to the room temperature) consisting of, in area fraction:

- retained austenite, with a surface fraction comprised between 10% and 20%,
- tempered martensite, with a surface fraction of at least 11%, for example comprised between 11% and 40%,
- between 40% and 60% of ferrite, preferably including, with respect to the whole structure, between 40% and 60% of intercritical ferrite and between 0% and 15% of transformation ferrite, preferably between 0% and 5%,
- at most 6% of fresh martensite, for example 2% to 5%,
- at most 18% of bainite, including lower bainite.

A fraction of retained austenite of at least 10%, together with a fraction of ferrite of at least 40%, allows obtaining a total elongation of at least 16%, and always of at least 17% when the sheet is not hot-dip coated, the elongation being measured according to ISO Standard ISO 6892-1.

Furthermore, this treatment allows obtaining an increased C content in the retained austenite, which is of at least 0.9%, preferably even of at least 1.0%, and up to 1.2%.

The martensite comprises fresh martensite, and tempered martensite.

The tempered martensite, which is partitioned martensite, has a C content of at most 0.45%, this content resulting from the partitioning of carbon from martensite towards austenite during the partitioning step. Especially, this content results from the partitioning of carbon from the martensite formed during the quenching towards the austenite.

A C content in the tempered (or partitioned) martensite of at most 0.45% is necessary to guarantee a sufficient stabilization of the austenite, and therefore a total elongation of at least 16%. In addition, a C content in the tempered martensite higher than 0.45% would lead to the precipitation of carbides within the martensite, increasing the yield strength. Therefore, a C content in the martensite of at most 0.45% allows achieving a yield strength of at most 860 MPa, and therefore a high formability of the steel sheet.

The C content in the tempered martensite is generally of at most 0.03%. A C content in the tempered martensite of at most 0.03% guarantees an optimum stabilization of the austenite, which does not transform into martensite during the hole expansion ratio test, and therefore guarantees a hole expansion ratio HER of at least 20%.

The fresh martensite, which results from the transformation of enriched austenite into martensite after the partitioning step, has a C content which is of at least 0.9% and generally less than 1.2%. The fraction of fresh martensite in the structure is lower than or equal to 6%. Indeed, a fraction of fresh martensite higher than 6% would lead to a hole expansion ratio lower than 20% according to ISO Standard ISO 16630:2009.

With this heat-treatment, steel sheets having a yield strength YS of at least 550 MPa, a tensile strength TS of at least 980 MPa, a total elongation TE according to the ISO standard 6892-1 of at least 16%, and even higher than 17%, and a hole expansion ratio HER according to the ISO standard 16630:2009 of at least 20%, and even at least 30%, can be obtained.

In particular, when the sheets are not hot-dip coated, the sheets have a yield strength YS of at least 600 MPa, a tensile strength TS of at least 980 MPa, a total elongation TE according to ISO standard 6892-1 of at least 17%, and even higher than 18%, and a hole expansion ratio HER according to the ISO standard 16630:2009 of at least 20%, and even at least 30%.

When the sheets are hot-dip coated, the sheets have a yield strength YS of at least 550 MPa, a tensile strength TS of at least 980 MPa, a total elongation TE according to ISO standard 6892-1 of at least 16%, and even higher than 18%, and a hole expansion ratio HER according to the ISO standard 16630:2009 of at least 20%, and even at least 30%.

EXAMPLES

As examples and comparison, sheets made of steel compositions according to Table I, have been manufactured, the elements being expressed in weight. The transformation temperatures such as Ac1 and Ac3 are reported in Table I. Ac1 and Ac3 were measured by dilatometry.

TABLE I

| Steel | C (%) | Mn (%) | Si (%) | Al (%) | Nb (%) | Cr (%) | Mo (%) | (C + Si/10) (%) | Ac1 (° C.) | Ac3 (° C.) |
|---|---|---|---|---|---|---|---|---|---|---|
| I | 0.18 | 2.5 | 1.2 | 0.6 | res. | res. | res. | 0.3 | 730 | 922 |
| II | 0.18 | 2.5 | 1.2 | 0.6 | 0.02 | res. | res. | 0.3 | 731 | 923 |
| III | 0.21 | 2.1 | 0.7 | 0.7 | 0.02 | 0.1 | res. | 0.28 | 723 | 1064 |
| IV | 0.19 | 2 | 1.5 | 0.04 | res. | res. | 0.15 | 0.34 | nd | nd |
| V | 0.21 | 1.87 | 1.46 | 0.04 | 0.015 | 0.2 | res. | 0.356 | nd | nd |

In this Table, "res." means that the element is only present as a residual, and that no voluntary addition of this element was made, and "nd" means that the value was not determined.

The sheets were hot-rolled, then coiled at 450° C. (steels I-III and V) or 730° C. (steel IV). Some of the sheets were batch annealed for 4 days at 550° C. or 650° C. The sheets, after coiling or batch-annealing, were pickled and cold rolled to obtain sheets having a thickness of 1 mm, 1.2 mm or 1.6 mm, annealed, quenched, partitioned and cooled to the room temperature. Some of the sheets were hot-dip coated by galvanizing at 460° C. between the partitioning and the cooling to the room temperature The conditions of treatment are reported in Table II for the non coated sheets, and in Table III for the hot-dip coated sheets.

TABLE II

| Example | Steel | Tcoil (° C.) | th (mm) | THBA (° C.) | $T_A$ (° C.) | $t_A$ (s) | QT (° C.) | PT (° C.) | Pt (s) |
|---|---|---|---|---|---|---|---|---|---|
| 1 | I | 450 | 1.2 | 550 | 850 | 100 | 230 | 400 | 200 |
| 2 | I | 450 | 1.2 | 550 | 850 | 100 | 250 | 400 | 200 |
| 3 | I | 450 | 1.2 | 550 | 850 | 100 | 230 | 440 | 200 |
| 4 | I | 450 | 1.2 | 550 | 850 | 100 | 250 | 440 | 200 |
| 5 | II | 450 | 1.2 | 550 | 830 | 100 | 200 | 400 | 200 |
| 6 | II | 450 | 1.2 | 550 | 850 | 100 | 230 | 400 | 200 |
| 7 | II | 450 | 1.2 | 550 | 850 | 100 | 230 | 400 | 400 |
| 8 | II | 450 | 1.2 | 550 | 850 | 100 | 250 | 400 | 200 |
| 9 | III | 450 | 1.6 | — | 820 | 100 | 220 | 400 | 100 |
| 10 | III | 450 | 1 | — | 820 | 100 | 220 | 430 | 200 |
| 11 | III | 450 | 1 | — | 820 | 100 | 220 | 450 | 200 |
| 12 | III | 450 | 1 | — | 810 | 100 | 220 | 440 | 200 |
| 12* | III | 450 | 1 | — | 810 | 100 | 220 | 440 | 200 |
| 13 | III | 450 | 1 | — | 820 | 100 | 230 | 420 | 200 |
| 14 | III | 450 | 1 | — | 830 | 100 | 230 | 420 | 200 |
| 15 | III | 450 | 1 | — | 840 | 100 | 250 | 400 | 200 |
| 16 | III | 450 | 1 | — | 820 | 100 | 250 | 440 | 200 |
| 17 | III | 450 | 1 | — | 820 | 100 | 250 | 440 | 300 |
| 18 | III | 450 | 1 | — | 820 | 100 | 250 | 440 | 200 |
| 19 | III | 450 | 1.6 | — | 820 | 100 | 250 | 440 | 200 |
| 20 | IV | 730 | 1.6 | 650 | 800 | 120 | 200 | 400 | 270 |
| 21 | IV | 730 | 1.6 | 650 | 800 | 120 | 220 | 430 | 200 |
| 22 | IV | 730 | 1.6 | 650 | 800 | 120 | 230 | 430 | 200 |
| 23 | IV | 730 | 1.6 | 650 | 820 | 80 | 220 | 430 | 180 |
| 24 | V | 450 | 1.6 | 650 | 820 | 225 | 225 | 400 | 433 |
| 25 | V | 450 | 1.6 | 650 | 820 | 79 | 225 | 400 | 181 |

In these tables, Tcoil designates the coiling temperature, th designates the thickness of the sheet after cold-rolling, THBA designates the batch annealing temperature, $T_A$ is the annealing temperature, $t_A$ is the annealing time, QT the quenching temperature, PT the partitioning temperature, Pt the partitioning time. In Table III, Ms designates the martensite start temperature of the austenite resulting from the annealing.

TABLE III

| Example | Steel | Ms (° C.) | Tcoil (° C.) | th (mm) | THBA (° C.) | $T_A$ (° C.) | $t_A$ (s) | QT (° C.) | PT (° C.) | Pt (s) |
|---|---|---|---|---|---|---|---|---|---|---|
| 26 | II | 317 | 450 | 1.2 | 550 | 850 | 100 | 230 | 460 | 60 |
| 27 | III | 280 | 450 | 1.6 | — | 820 | 100 | 220 | 460 | 30 |
| 28 | III | 280 | 450 | 1.6 | — | 820 | 100 | 220 | 460 | 60 |
| 29 | III | 280 | 450 | 1.6 | — | 820 | 100 | 220 | 460 | 80 |
| 30 | III | 280 | 450 | 1.6 | — | 820 | 100 | 250 | 460 | 60 |
| 31 | III | 280 | 450 | 1 | — | 820 | 100 | 250 | 460 | 60 |

Measured properties are the Hole expansion ratio HER measured according to the standard ISO 16630:2009, the yield strength YS, the tensile stress TS, the uniform elongation UE and the total elongation TE. The yield strength YS, the tensile stress TS, the uniform elongation UE and the total elongation TE were measured according to the ISO standard ISO 6892-1, published in October 2009, except for example 12*, which is identical to example 12, and examples 21, 22, 24 and 25, for which these properties were measured according to the JIS Z 2201-05 standard.

The mechanical properties and the microstructures obtained for the sheets which were not hot-dip coated are reported in Table IV. F is the area fraction of ferrite, TM is the area fraction of tempered martensite, FM is the area fraction of fresh martensite, RA is the area fraction of retained austenite and B is the area fraction of bainite.

In all these examples 1 to 25, the C content of the tempered martensite is of at most 0.45%.

TABLE IV

| Example | Steel | F (%) | TM (%) | FM (%) | RA (%) | B (%) | YS (MPa) | TS (MPa) | UE (%) | TE (%) | HER (%) |
|---|---|---|---|---|---|---|---|---|---|---|---|
| 1 | I | 42 | 37 | 3 | 12 | 6 | 688 | 1051 | 14.1 | 18.4 | 49 |
| 2 | I | 42 | 32 | 2 | 10 | 14 | 666 | 1045 | 13.7 | 18.3 | 33 |
| 3 | I | 42 | 37 | 3 | 12 | 6 | 858 | 1094 | 13.9 | 18.7 | 33 |
| 4 | I | 42 | 32 | 2 | 12 | 12 | 639 | 1119 | 14.2 | 18.1 | 32 |
| 5 | II | 49 | 34 | 1 | 10 | 6 | 765 | 1156 | 14.7 | 18.5 | 27 |
| 6 | II | 42 | 37 | 5 | 12 | 4 | 698 | 1128 | 14.2 | 17.8 | 26 |
| 7 | II | 42 | 37 | 4 | 13 | 4 | 848 | 1134 | 13.6 | 17.2 | 29 |
| 8 | II | 42 | 32 | 3 | 10 | 13 | 776 | 1146 | 13.7 | 17.2 | 26 |
| 9 | III | 52 | 20 | 5 | 16 | 7 | 698 | 1028 | 10.8 | 17.1 | 40 |
| 10 | III | 52 | 20 | 3 | 12 | 13 | 732 | 1015 | 14.3 | 18.0 | 31 |
| 11 | III | 52 | 20 | 2 | 13 | 13 | 701 | 1032 | 13.9 | 18.2 | 36 |
| 12 | III | 53 | 21 | 2 | 14 | 10 | 633 | 995 | 15.1 | 18.5 | 28 |
| 12* | III | 53 | 21 | 3 | 14 | 9 | 642 | 994 | 15.7 | 21.1 | 28 |
| 13 | III | 52 | 20 | 5 | 14 | 9 | 720 | 990 | 14.6 | 18.4 | 35 |
| 14 | III | 48 | 27 | 5 | 13 | 7 | 725 | 987 | 14.7 | 18.4 | 21 |
| 15 | III | 46 | 24 | 5 | 15 | 10 | 811 | 1041 | 12.0 | 17.4 | 42 |
| 16 | III | 51 | 20 | 5 | 16 | 8 | 619 | 1014 | 16.0 | 19.6 | 28 |
| 17 | III | 51 | 20 | 4 | 18 | 7 | 664 | 1017 | 16.2 | 20.2 | 22 |
| 18 | III | 51 | 20 | 6 | 16 | 7 | 630 | 987 | 16.1 | 19.7 | 32 |
| 19 | III | 51 | 20 | 6 | 13 | 10 | 610 | 988 | 15.6 | 20.5 | 21 |
| 20 | IV | 46 | 39 | 3 | 11 | 1 | 664 | 994 | 12 | 17 | 28 |
| 21 | IV | 46 | 35 | 3 | 13 | 3 | 645 | 983 | 13.5 | 20.3 | 26 |
| 22 | IV | 46 | 34 | 3 | 13 | 4 | 617 | 980 | 14.5 | 21.4 | 29 |
| 23 | IV | 44 | 38 | 3 | 13 | 2 | 721 | 1010 | 12 | 17 | 31 |

TABLE IV-continued

| Example | Steel | F (%) | TM (%) | FM (%) | RA (%) | B (%) | YS (MPa) | TS (MPa) | UE (%) | TE (%) | HER (%) |
|---|---|---|---|---|---|---|---|---|---|---|---|
| 24 | V | 57 | 11 | 2 | 12 | 18 | 665 | 994 | 15.2 | 21.8 | 28 |
| 25 | V | 57 | 11 | 2 | 12 | 18 | 604 | 985 | 16.2 | 24.6 | 23 |

These examples show that with a method according to the invention, when no hot-dip coating is performed, steel sheets having a tensile strength of at least 980 MPa and a total elongation according to ISO 6892-1 of at least 17%, and even of more than 18% can be obtained. These steel sheets have also a yield strength of at least 600 MPa, and lower than 860 MPa, a uniform elongation of at least 10%, and generally of more than 13%, and a hole expansion ratio HER according to ISO 16630:2009 of at least 20%, and even of more than 30%.

The comparison of examples 1-4 shows that the method is very robust with variations of the quenching temperature QT and the partitioning temperature PT. In particular, example 10 shows that when the sheet is not hot-dip coated, choosing a partitioning temperature PT comprised between 375° C. and 450° C. and a partitioning time Pt comprised between 100 s and 440 s, in particular higher than 100 s make it possible to achieve a total elongation of at least 17%.

Besides, the comparison of the total elongations measured for examples 12 and 12* demonstrate that the values of the total elongation TE according to the ISO standard are lower, in this case about 3% lower, than the values of the total elongation according to the JIS Z 2201-05 standard.

The mechanical properties and the microstructure obtained for the hot-dip coated sheets are reported in Table V. As previously stated, TE is measured according to ISO 6892-1 and HER according to ISO 16630:2009. Moreover, F is the area fraction of ferrite, TM is the area fraction of tempered martensite, FM is the area fraction of fresh martensite, RA is the area fraction of retained austenite and B is the area fraction of bainite.

TABLE V

| Example | Steel | F (%) | TM (%) | FM (%) | RA (%) | B (%) | YS (MPa) | TS (MPa) | UE (%) | TE (%) | HER (%) |
|---|---|---|---|---|---|---|---|---|---|---|---|
| 26 | II | 43 | 37 | 3 | 15 | 2 | 588 | 1217 | 12.9 | 16.4 | 21 |
| 27 | III | 52 | 20 | 5 | 10 | 13 | 722 | 1027 | 12.0 | 16.8 | 30 |
| 28 | III | 52 | 20 | 4 | 11 | 13 | 732 | 1022 | 12.8 | 17.9 | 40 |
| 29 | III | 52 | 20 | 3 | 11 | 14 | 707 | 1020 | 13.8 | 18.7 | 37 |
| 30 | III | 52 | 14 | 2 | 17 | 15 | 550 | 1003 | 15.1 | 19.8 | 29 |
| 31 | III | 52 | 14 | 2 | 19 | 13 | 605 | 1026 | 14.2 | 17.9 | 21 |

In examples 26-31, the C content of the tempered martensite is of at most 0.45%.

These examples show that with a method according to the invention, hot-dip coated steel sheets having a tensile strength of at least 980 MPa and a total elongation according to ISO 6892-1 of at least 16%, and even of more than 18% can be obtained. These steel sheets have a yield strength of at least 550 MPa, and lower than 860 MPa, a uniform elongation of at least 12% and a hole expansion ratio according to ISO 16630:2009 HER of at least 20%, and even of more than 30%.

Regarding the spot weldability, the sheets according to the invention have a low LME sensitivity when the composition is such that C+Si/10≤0.30%. It means that which steels it is possible to produce structures comprising resistance spot welds, such as car bodies, for which the probability of the number of cracks in the resistance spot welds is such that the mean value is less than 6 cracks per resistance spot weld and the probability to have less than 10 cracks is 98%.

In particular, a welded structure, including resistance spot weld, of at least two steel sheets, can be produced by producing a first steel sheet by a method according to the invention, the first sheet being such that C+Si/10≤0.30% and Al≥6(C+Mn/10)−2.5% and being coated with Zn or a Zn alloy, providing a second steel sheet having a composition such that C+Si/10≤0.30% and Al≥6(C+Mn/10)−2.5%, and resistance spot welding the first steel sheet to the second steel sheet. The second steel sheet may for example be produced by a method according to the invention, and coated with Zn or a Zn alloy.

Thus, a welded structure having a low LME sensitivity is obtained. For example, for such a welded structure comprising at least ten resistance spot welds, the mean number of cracks per resistance spot weld is less than 6.

The steel sheets optionally welded by resistance spot welding according to the invention are used with profit for the manufacture of structural parts in motor vehicles since they offer high formability during the fabrication process and high energy absorption in case of collision. The resistance spot welds according to the invention are also used with profit for the manufacture of structural parts in motor vehicles, since eventual initiation and propagation of cracks located in the welded zones are much reduced.

What is claimed is:

1. A method for producing a steel sheet having a tensile strength of at least 980 MPa, a total elongation of at least 16%, and a hole expansion ratio HER of at least 20%,
the method for producing the steel sheet comprising the successive steps of:
providing a cold-rolled steel sheet, made of a steel having a chemical composition including by weight:
0.15%≤C≤0.23%,
1.4%≤Mn≤2.6%,
0.6%≤Si≤1.5%,
0.02%≤Al≤1.0%,
with 1.0%≤Si+Al≤2.0%,
0≤Nb≤0.035%,
0≤Mo≤0.3%,
0≤Cr≤0.3%,
Ni<0.05%,
Cu<0.03%,
V<0.007%,
B<0.0010%,
S<0.005%,
P<0.02%,
N<0.010%, and
a remainder, the remainder including Fe and unavoidable impurities;
annealing the steel sheet at an annealing temperature TA between Ac1 and Ac3 to obtain a structure including at least 40% austenite and at least 40% intercritical ferrite;
quenching the steel sheet from a temperature of at least 600° C., at a cooling rate of at least 20° C./s, down to a quenching temperature QT between 180° C. and 260° C.;
heating the steel sheet up to a partitioning temperature PT between 375° C. and 470° C.;
maintaining the steel sheet at the partitioning temperature PT for a partitioning time Pt between 25 s and 440 s, the partitioning time Pt being between 100 s and 440 s if the partitioning temperature PT is between 375° C. and 400° C., the partitioning time Pt being between 25 s and 150 s if the partitioning temperature PT is between 450° C. and 470° C.; and cooling the steel sheet down to room temperature and obtaining the steel sheet made of a steel having a chemical composition including by weight:
0.15%≤C≤0.23%,
1.4%≤Mn≤2.6%,
0.6%≤Si≤1.5%,
0.02%≤Al≤1.0%,
with 1.0%≤Si+Al≤2.0%,
0≤Nb≤0.035%,
0≤Mo≤0.3%,
0≤Cr≤0.3%,
Ni<0.05%,
Cu<0.03%,
V<0.007%,
B<0.0010%,
S<0.005%,
P<0.02%,
N<0.010%, and
a remainder, the remainder including Fe and unavoidable impurities, the steel sheet having a microstructure consisting of, in area fraction:
at least 11% tempered martensite, the tempered martensite having a C content of at most 0.45%,
between 10% and 20% retained austenite, wherein the retained austenite has a C content between 0.9% and 1.2%,
between 40% and 60% ferrite,
at least 2% and at most 6% fresh martensite, and
at least 1% and at most 18% bainite, the bainite including lower bainite,
the ferrite consisting of, with respect to the whole microstructure, between 40% and 60% intercritical ferrite and between 0% and 15% transformation ferrite, the steel sheet having a yield strength below 860 MPa.

2. The method according to claim 1, wherein the tempered martensite has a C content of at most 0.03%.

3. The method according to claim 1, wherein just before the step of heating to the partitioning temperature PT, the steel sheet has a microstructure consisting of:
between 40% and 60% ferrite,
at least 15% retained austenite,
at least 11% martensite, and
at most 18% lower bainite.

4. The method according to claim 1, further comprising a step of:
slow cooling the sheet to the temperature of at least 600° C. at a cooling rate lower than 10° C./s between the annealing step and the quenching step.

5. The method according to claim 1, wherein the step of providing the cold-rolled steel sheet comprises:
hot rolling a sheet made of the steel to obtain a hot rolled steel sheet;
coiling the hot-rolled steel sheet at a coiling temperature Tc between 400° C. and 750° C.;
performing a batch annealing at a temperature THBA between 500° C. and 700° C. for a time between 2 and 6 days; and
cold rolling the hot-rolled steel sheet to obtain the cold-rolled steel sheet.

6. The method according to claim 1, further comprising the step of:
holding the steel sheet at the quenching temperature QT for a holding time between 2 s and 8 s, after the steel sheet is quenched to the quenching temperature QT and before the steel sheet is heated to the partitioning temperature PT.

7. The method according to claim 1, wherein the chemical composition of the steel satisfies at least one of the following conditions:
C≥0.17%,
C≤0.21%,
Mn≥1.9%,
Mn≤2.5%,
0.010%≤Nb,
Mo≤0.05%, or
Mo≥0.1%,
Cr≤0.05%, or
Cr≥0.1%.

8. The method according to claim 1, further comprising a step of:
hot dip coating the steel sheet at a temperature of at most 480° C.
between the step of maintaining the steel sheet at the partitioning temperature PT and the step of cooling the steel sheet to the room temperature,
the partitioning temperature PT being between 400° C. and 470° C., and
the partitioning time Pt being between 25 s and 150 s.

9. The method according to claim 8, wherein the steel sheet is coated with Zn or a Zn alloy.

10. The method according to claim 1, wherein
after the step of maintaining the steel sheet at the partitioning temperature PT, the steel sheet is immediately cooled to the room temperature,
the partitioning temperature PT being between 375° C. and 450° C., and
the partitioning time Pt being between 100 s and 440 s.

11. The method according to claim 10, further comprising after the step of cooling down the steel sheet to the room temperature, coating the steel sheet by an electrochemical method or a vacuum coating process.

12. The method according to claim 1, wherein the chemical composition of the steel includes 0.7%≤Si<1.0% and 0.7%≤Al≤1.0%.

13. The method according to claim 1, wherein the chemical composition of the steel includes 1.0%≤Si≤1.5% and 0.02%≤Al≤0.5%.

14. A structural part for a motor vehicle comprising:
a steel sheet produced according to claim 1.

15. A process for producing a resistance spot weld of at least two steel sheets, the process comprising:
providing a first steel sheet made of a steel having a chemical composition including by weight:
0.15%≤C≤0.23%,
1.4%≤Mn≤2.6%,
0.6%≤Si≤1.5%
0.02%≤Al≤1.0%,
with 1.0%≤Si+Al≤2.0%,
0≤Nb≤0.035%,
0≤Mo≤0.3%,
0≤Cr≤0.3%,
Ni<0.05%,
Cu<0.03%,
V<0.007%,
B<0.0010%,
S<0.005%,
P<0.02%,
N<0.010%, and
a remainder, the remainder including Fe and unavoidable impurities, the steel sheet having a microstructure consisting of, in area fraction:
at least 11% tempered martensite, the tempered martensite having a C content of at most 0.45%, between 10% and 20% retained austenite, wherein the retained austenite has a C content between 0.9% and 1.2%,
between 40% and 60% ferrite,
at least 2% and at most 6% fresh martensite, and
at least 1% and at most 18% bainite, the bainite including lower bainite,
the ferrite consisting of, with respect to the whole microstructure, between 40% and 60% intercritical ferrite and between 0% and 15% transformation ferrite, the steel sheet having a yield strength below 860 MPa,
wherein the chemical composition of the steel includes C+Si/10≤0.30% and Al≥6(C+Mn/10)−2.5%;
providing a second steel sheet having a composition including C+Si/10≤0.30% and Al≥6(C+Mn/10)−2.5%; and
resistance spot welding the first steel sheet to the second steel sheet.

16. A structural part for a motor vehicle comprising:
a resistance spot weld produced according to claim 15.

17. A steel sheet, made of a steel having a chemical composition including by weight:
0.15%≤C≤0.23%,
1.4%≤Mn≤2.6%,
0.6%≤Si≤1.5%
0.02%≤Al≤1.0%,
with 1.0%≤Si+Al≤2.0%,
0≤Nb≤0.035%,
0≤Mo≤0.3%,
0≤Cr≤0.3%,
Ni<0.05%,
Cu<0.03%,
V<0.007%,
B<0.0010%,
S<0.005%,
P<0.02%,
N<0.010%, and
a remainder, the remainder including Fe and unavoidable impurities, the steel sheet having a microstructure consisting of, in area fraction:
at least 11% tempered martensite, the tempered martensite having a C content of at most 0.45%,
between 10% and 20% retained austenite, wherein the retained austenite has a C content between 0.9% and 1.2%,
between 40% and 60% ferrite,
at least 2% and at most 6% fresh martensite, and
at least 1% and at most 18% bainite, the bainite including lower bainite,
the ferrite consisting of, with respect to the whole microstructure, between 40% and 60% intercritical ferrite and between 0% and 15% transformation ferrite, the steel sheet having a yield strength below 860 MPa.

18. The steel sheet according to claim 17, wherein the tempered martensite has a C content of at most 0.03%.

19. The steel sheet according to claim 17, wherein the steel sheet has a yield strength of at least 550 MPa, a tensile strength of at least 980 MPa, a total elongation of at least 16%, and a hole expansion ratio HER of at least 20%.

20. The steel sheet according to claim 17, wherein the chemical composition of the steel satisfies at least one of the following conditions:
C≥0.17%,
C≤0.21%,
Mn≥1.9%,
Mn≤2.5%,
Mo≤0.05%, or
Mo≥0.1%,
0.010%≤Nb,
Cr≤0.05%, or
Cr≥0.1%.

21. The steel sheet according to claim 17, wherein the chemical composition of the steel includes C+Si/10≤0.30% and Al≥6 (C+Mn/10)−2.5%.

22. The steel sheet according to claim 21, wherein the chemical composition of the steel includes 0.6%≤Si≤1.3%.

23. The steel sheet according to claim 22, wherein the chemical composition of the steel includes 0.7%≤Si<1.0% and 0.7%≤Al≤1.0%.

24. The steel sheet according to claim 21, wherein the steel sheet is coated with Zn or a Zn alloy, the coating occurring at a temperature less than 480° C.

25. The steel sheet according to claim 17, wherein the chemical composition of the steel includes 1.0%≤Si≤1.5%.

26. The steel sheet according to claim 17, wherein the steel sheet has a thickness between 0.7 and 3 mm.

27. A welded structure comprising:
at least ten resistance spot welds; and
at least two steel sheets, a first of the at least two steel sheets is a steel sheet according to claim 17, and a second of the at least two steel sheets has a composition including C+Si/10≤0.30% and Al≥6(C+Mn/10)−2.5%,
a mean number of cracks per resistance spot weld being less than 6.

28. A structural part for a motor vehicle comprising:
a welded structure according to claim 27.

29. A welded structure comprising:
at least ten resistance spot welds; and
at least two steel sheets, a first and a second of the at least two steel sheets being steel sheets according to claim 17, the second of the least two steel sheets having a composition including C+Si/10≤0.30% and Al≥6(C+Mn/10)−2.5%,
a mean number of cracks per resistance spot weld being less than 6.

30. A structural part for a motor vehicle comprising:
a steel sheet according to claim 17.

31. The steel sheet according to claim 17, wherein the bainite consists of lower bainite.

32. The steel sheet according to claim 17, wherein the chemical composition of the steel includes 0.6%≤Al≤1.0%.

33. The steel sheet according to claim 17, wherein the steel sheet is uncoated.

* * * * *